Patented Feb. 28, 1950

2,499,255

UNITED STATES PATENT OFFICE 2,499,255

CATALYST PREPARATION

Robert L. Parker, Jr., Los Angeles, Calif., assignor to Union Oil Company of California, Los Angeles, Calif., a corporation of California No Drawing. Application September 18, 1944, Serial No. 554,719

7 Claims. (Cl. 196—52)

This invention relates to a new and improved method of preparing catalysts of the type comprising a carrier upon which is supported an active catalytic agent.

Catalytic cracking, dehydrogenation, hydrogenation, desulfurization, hydroforming and reforming of hydrocarbons are well known processes. For these processes many catalytic agents have been employed with varying success. Such catalytic agents include the oxides or other compounds of metals such as chromium, molybdenum, cobalt, nickel, zinc, iron, lead, cadmium, vanadium, manganese, tantalum, tungsten, titanium, platinum, columbium, scandium, thorium, uranium, zirconium, tin, copper, etc., which compounds may be produced by an appropriate treatment of the chromates, molybdates, vanadates, sulfates, nitrates, chlorides and other suitable salts of the metals by methods well known in the art. Many of these catalytic agents are effective only when supported on such carriers as alumina, magnesia, silica, zinconia, titania, thoria, and the like. The oxides or combinations thereof, of chromium, molybdenum, and cobalt, distended on alumina are the preferred catalysts for the above processes. For example, in a process generally described as hydroforming a typical commercially prepared catalyst comprising about 9% molybdenum oxide and 91% of alumina is capable of increasing the aromatic content of a naphtha boiling between 200° F. and 280° F. from about 14.3% to about 58% by volume at a temperature of about 950° F., liquid hourly space velocity of 1, a gage pressure of 100 pounds per square inch and with an added 3,000 cubic feet of hydrogen per barrel of feed. Also in a process generally described as dehydrogenation a catalyst composed of about 5% chromium oxide and 95% alumina is capable of effecting as much as 28% conversion of normal butane to butene at a temperature of 1050° F. at substantially atmospheric pressure and a gaseous space velocity of from 15 to 17 volumes of butane per volume of catalyst per minute. Similarly in the desulfurization of hydrocarbon stocks a catalyst composed of about 20% of the combined oxides of cobalt and molybdenum and 80% alumina is capable of reducing the sulfur content of a pressure distillate boiling in the range of 100° F. to 400° F. from 3.5 weight per cent to about 0.01 weight per cent at a temperature of 700° F., pressure of 300 pounds per square inch gage, liquid hourly space velocity of 1, and with 3,000 cubic feet of added hydrogen per barrel of feed.

Well known processes for preparing catalysts of the above type consist of impregnation and co-precipitation. In preparing such a catalyst by impregnation the carrier in the form of a powder, granules or pellets is immersed in a solution of a suitable soluble salt of a desired metal such as ammonium molybdate, chromium nitrate, ammonium dichromate, cobalt nitrate, and the like, whereupon the carrier having adsorbed a portion of the solution is dried and calcined at a temperature in the range of about 400° C. to about 700° C. to convert the absorbed salt to the oxide of the metal or metals employed. In preparing a catalyst by coprecipitation the process embodies a simultaneous precipitation of the hydrated oxide of the carrier and the hydrated oxide or oxides of the desired catalytic agents from a solution containing appropriate amounts of the suitable soluble salts of the carrier type material and the metal or metals employed as catalytic agent. A modification of this procedure consists of precipitating the hydrous oxides of the catalytic agent in the presence of a wet carrier gel. For example, in preparing a hydroforming catalyst as described above comprising approximately 9% molybdenum oxide and 91% alumina by the method of impregnation the alumina may be immersed in a solution of ammonium molybdate and in turn dried and calcined at a temperature in the range of about 400° C. to about 700° C. to convert the absorbed ammonium molybdate to molybdenum trioxide. Also in preparing a catalyst of the desulfurization type comprising an alumina carrier and a catalytic agent consisting of the combined oxides of cobalt and molybdenum by the method of coprecipitation, a solution of cobalt nitrate may be added to a solution of aluminum nitrate followed by the addition of a solution of ammonium molybdate containing excess ammonium hydroxide whereby the pH of the combined solution is increased to a value greater than 7, precipitating the hydrated oxides of aluminum, cobalt and molybdenum therefrom. The gel is then filtered and washed and subsequently dried and calcined to yield a catalyst comprised of aluminum oxide and the combined oxides of cobalt and molybdenum.

It is a particular object of my invention to prepare a catalyst in which the catalytic agent is supported on the carrier in a more nearly monomolecular layer and as a consequence is more active than catalysts as presently prepared. It is a further object of my invention to prepare a catalyst in a new and novel manner which is much simpler and less costly than the present preparation methods. It is a still further object of my invention to prepare a catalyst possessing a longer effective catalytic life than those prepared by the above described methods.

Other objects and advantages of my invention will become apparent to those skilled in the art as the description thereof proceeds.

Briefly, my invention consists of preparing a catalyst comprised of an active catalytic agent supported on a carrier by subjecting an oxygen or sulfur containing compound of the desired metal agent to conditions of temperature and pressure which will bring about the sublimation of either the compound employed or the oxide produced from said compound by the temperature employed, wherein said catalytic agent is vaporized and in such state is adsorbed on the carrier employed to give a catalyst consisting of an adsorbent type carrier with one or more of the compounds of the above listed metals distended thereon. I choose to employ in the sublimation either the metal oxides, metal sulfides, or such compounds of the metals which may by the presence of heat and oxygen be converted to the metallic oxide. Thus if such compounds as molybdic acid, ammonium molybdate, chromium nitrate, ammonium dichromate, cobalt nitrate, ammonium vanadate, and the like are employed the conversion of said salts to the corresponding oxides may be accomplished at temperatures below the sublimation temperature and in this manner the sublimation of the oxide itself will be effected. Or I may prefer to employ such compounds as molybdenum sulfide, cobalt sulfide, or the like and perform the sublimation in an inert atmosphere thereby distending said metallic sulfide on the desired carrier which sulfide may later if so desired be converted to the corresponding oxide by the application of heat and oxygen.

It is well known that solids like liquids possess a definite vapor pressure at each temperature which vapor pressure may vary to a considerable extent with each solid. The vapor pressure of a solid increases with temperature and the variation can be represented by a curve which is generally called a sublimation curve, the term "sublimation" being used to indicate a direct conversion of a solid to a vapor without the intervention of the liquid state.

It is clear therefore that it is possible to sublime certain solids by supplying heat, but not enough to raise the temperature to the melting point, and simultaneously remove the vapors, thereby preventing the establishment of a vapor pressure equilibrium. Thus if a phase diagram is drawn for any solid it is seen that there are definite conditions of temperature and pressure, below what is known as the triple point, at which a solid and its vapor will be in equilibrium in the absence of the liquid state. If the vapors are removed from such a system more of the solid will vaporize to reestablish the equilibrium. Thus if the vapors are continually removed from this system the vapor pressure of the solid will continue to exceed the partial pressure of the vapor and so the solid will continue to vaporize.

We have made new use of the property of sublimation in the process of our invention by performing high temperature sublimations in the range of 400° F. to 2,000° F. and at pressures in the range of about −14 pounds per square inch to atmospheric or above to prepare catalysts for high temperature hydrocarbon conversion processes such as dehydrogenation, desulfurization, hydrogenation, hydroforming, cracking and the like which processes are operated in the range of about 500° F. to about 1,500° F. and which processes employ catalysts of the type consisting of a highly adsorbent carrier such as for example alumina, silica, magnesia, titania, zirconia, and the like, and a compound of one or more of the metals hereinbefore listed and preferably one or more of the oxides of the metals of groups V, VI, and VIII of the periodic table. These processes while operating at temperatures in the range of 500° F. to 1,500° F. and preferably in the range of 650° F. to 1,200° F. may employ pressures in the range of −14 pounds to as high as 1,000 pounds per square inch.

Thus in the process known as hydroforming I may employ a catalyst, comprising about 8% to 12% molybdenum oxide and about 88% to 92% alumina, prepared by the process of sublimation as disclosed herein; subject a selected hydrocarbon feed to the action of said catalyst at temperatures in the range of about 700° F. to about 1,200° F. and preferably about 850° F. to 1,050° F. and at pressures of about 100 to about 500 pounds per square inch or higher in the presence of a hydrogen rich recycle gas whereby a substantial portion of said hydrocarbon feed is converted to aromatic hydrocarbons. Whereas, catalysts consisting of from 8–12% molybdenum oxide and from about 88% to about 92% alumina are the preferred catalysts for this operation, I have found that catalysts containing as low as 5% by weight and as high as 15% by weight of molybdenum oxide and 85% to 95% alumina were found to be good catalysts.

Also in a hydrocarbon conversion process known as desulfurization I may employ a catalyst, comprising from about 2 to about 40 weight per cent and preferably about 3 to about 20 weight per cent of the combined oxides of cobalt and molybdenum and from about 60 to about 98 weight per cent of alumina, prepared by the method of sublimation, for reducing the sulfur content of petroleum fractions or even crude oil. The desulfurization is carried out by passing the desired petroleum stock over the catalyst at temperatures ranging from as low as 500° F. to as high as about 1,000° F. but preferably in the range of about 600° F. to about 900° F. and at pressures in the range of a few atmospheres to about 1,000 pounds per square inch in the presence of a hydrogen rich recycle gas.

Further in the process of dehydrogenation I will employ a catalyst comprising from about 1 to about 20 weight per cent and preferably about 5 to about 15 weight per cent of chromium oxide supported on alumina which catalyst is prepared by the process of sublimation. The dehydrogenation of the normally gaseous hydrocarbons may be carried out at temperatures in the range of about 900° F. to about 1,500° F. and preferably in the range of about 1,000° F. to about 1,200° F. at pressures in the range of −14 pounds per square inch to atmospheric or above.

In the process of my invention, I have made use of the property of a solid to sublime under certain conditions by incorporating in such a system an adsorbent type of catalyst carrier which may be maintained at the same conditions of temperature and pressure as the catalytic agent employed which adsorbent material will, by adsorbing said vapors destroy the equilibrium in the system and thereby insure the continued vaporization of the catalytic agent.

In this manner, for example, I may prepare a hydroforming catalyst of the type described above comprising molybdenum oxide supported on an alumina carrier by comingling the powdered alumina with powdered molybdenum trioxide, molybdic acid, ammonium molybdate, molybdenum sulfide, or the like, heating said mixture to a temperature at which the molybdenum salt will vaporize either as is or after it has decomposed to the oxide but which is below the melting point of said salt or oxide whereupon the vapors are adsorbed by the alumina maintaining a lower partial pressure of molybdenum oxide vapor than the vapor pressure exerted by the solid at the temperature employed and thereby bringing about its continued sublimation. By this process the catalytic agent, in this case molybdenum oxide, is distended on the alumina while the molybdenum oxide is in the vapor state.

Little is known about the physical or chemical considerations involved in this adsorption due to the difficulties inherent in determining such factors. It is felt, however, that the mechanism involves, to a certain extent, the partial chemisorption of the molybdenum oxide by the alumina with the interstices of the alumina being filled with molybdenum oxide vapor which may or may not remain in the vapor state until such time as the alumina is cooled sufficiently to bring about its condensation due to temperature differential alone. In any case an excessive build-up of molybdenum oxide in certain pores or capillaries is prevented by the vaporous nature of the molybdenum oxide at the time of adsorption and the resultant independence of vapor concentration and subsequently solid concentration as a function of pore size. Thus, in any pores or interstices of larger size than the molybdenum oxide molecule an equal concentration of vaporous or solid molybdenum oxide will result. On the other hand, in preparing a catalyst by the method of impregnation, solution phenomena must be considered such as for example surface tension and the large size of the water molecule both of which prevent the penetration of the solution into capillaries which are not only readily accessible to the molybdenum oxide vapors as such in the above preparation method but also to the hydrocarbon vapors in the catalytic process.

Therefore, in preparing two catalysts of the same composition by impregnation and by sublimation, it is possible to obtain a more uniform distribution of the catalytic agent throughout the carrier by the process of sublimation due to the higher degree of penetrability of the vapors of said catalytic agent than is exhibited by the solution which is employed to impregnate the alumina with such catalytic agent. In this manner, a more efficient utilization of the catalytic agent is realized when a catalyst is prepared by my method of sublimation. This may be observed in catalysts prepared by the two methods in a higher activity exhibited by catalysts prepared by the process of my invention containing lower concentrations of catalytic agent than is exhibited by catalysts prepared by the method of impregnation.

In like manner, when employing the method of coprecipitation in catalyst preparation, a certain amount of the catalytic agent is found to be enclosed within the gel structure of the carrier rather than on the surfaces of the pores and capillaries tending to reduce the efficiency of the particular catalyst in promoting reactions inasmuch as catalysts of the above types are surface phenomena and are dependent on the catalytic agent distended on the surfaces of the carrier employed.

In my preferred method of preparing a catalyst by the process of sublimation, an adsorbent type carrier in the form of powder, pellets, granules, extruded particles, or the like, is comingled with the particular catalytic agent desired and the mixture of carrier and catalytic agent is subjected to conditions of temperature and pressure which are found optimum in the particular sublimation wherein the catalytic agent is transferred to the carrier by passage from the solid to a vapor state and subsequent adsorption of said vapors from the carrier material. If the decomposible oxygen or sulfur containing salts of the metals are employed the decomposition to the oxide will occur in some cases before the desired sublimation temperature is attained. In this method of preparation the calculated amount of the catalytic agent is employed wherein the final catalytic composition may be predetermined and the time element is of minor importance. After allowing sufficient elapsed time to complete the sublimation of the catalytic agent the catalyst is removed from the preparation zone and allowed to cool whereby the finished catalyst results. If powder or granular carrier material is employed it may be desirable to pellet or otherwise form such material, or it may be employed in the powder or granular form.

In preparing a catalyst by the above method in which a powdered carrier material is employed it is possible to comingle therewith powdered catalytic material such as for example, molybdenum oxide, molybdic acid, ammonium molybdate, chromium oxide, chromium nitrate, cobalt oxide, cobalt nitrate, ammonium dichromate, molybdenum sulfide, cobalt sulfide, and the like, and in such comingled state perform the sublimation maintaining the desired conditions of temperature and pressure wherein no agitation or mixing of the various constituents is necessary during the process of sublimation. If on the other hand it is desired to employ granular or pelleted carrier material in the preparation, it is highly desirable in performing the sublimation to mix or agitate the constituents so as to insure a more even adsorption of the vaporous catalytic agent by the carrier. This mixing or agitation may be accomplished by any desired mechanical means as for example in a rotary kiln.

The following specific examples of catalyst preparation by the above described methods will serve to give a clear picture of the process of my invention.

1. A hydroforming catalyst comprising 10.7% molybdenum oxide and 89.3% alumina was prepared by mixing 219.6 grams of powdered alumina with 27 grams of technical molybdenum trioxide, which mixture was placed in a muffle and maintained therein at a temperature of 700° C. and at atmospheric pressure for a period of three hours in which time the sublimation of molybdenum trioxide was effected, whereby transfer to the alumina took place and the finished catalyst of 10.7% $MoO_3$ and 89.3% alumina resulted. The quantity of molybdenum oxide employed in this sublimation was calculated on the basis of pure $MoO_3$. Inasmuch as the molybdenum oxide employed was a technical grade and the quantities of both alumina and molybdenum oxide were small, the recovery on the catalyst was practically complete.

2. Another catalyst was prepared by the method of impregnation hereinbefore described using the same alumina base, employed in the above catalyst, which catalyst had the final composition of 12.0% molybdenum oxide and 88.0% alumina and the two catalysts were compared by hydro-forming a narrow boiling naphtha at 950° F. isothermal block temperature, 100 pounds per square inch gage pressure, liquid hourly space velocity of one and with 3,000 cubic feet of added hydrogen per barrel of feed, giving the following tabulated results.

TABLE I

*Comparison of impregnated and sublimed hydroforming catalysts*

|  | 1 | 2 |
|---|---|---|
| Catalyst: |  |  |
| Preparation Method | (1) | (2) |
| MoO₃, weight percent | 10.7 | 12.0 |
| Apparent Bulk Density, gms./ml | 0.82 | 0.83 |
| Yields: |  |  |
| Liquid Recovery, Vol. percent of Feed | 71.2 | 69.0 |
| Synthetic Aromatics | 36.0 | 32.5 |
| Synthetic Toluene | 16.4 | 14.8 |
| Analysis of Hydroformate: |  |  |
| Gravity, °A. P. I. at 60° F | 42.6 | 43.3 |
| Total Aromatics, Vol. percent | 70.3 | 67.7 |
| Toluene, Vol. percent | 34.6 | 33.8 |

¹ Sublimation.
² Impregnation.

It has been shown repeatedly in the industry that the activity of a hydroforming catalyst prepared on a given alumina carrier is directly proportional to the per cent of molybdenum oxide contained therein when the catalysts are prepared in the same manner. I have, however, as evidenced by the above data prepared a catalyst by the process of sublimation containing only 10.7% molybdenum oxide which is decidedly more active for the conversion of a hydrocarbon feed stock to aromatics than is a catalyst prepared by impregnation of the same alumina base with 12.0% molybdenum oxide. This superiority is attributed as described above to the more even distribution and therefore thinner layer of molybdenum oxide deposited through the alumina.

It has been found that certain catalysts employed for promoting dehydrogenation, hydroforming, desulfurization, cracking, and hydrogenation of petroleum hydrocarbons have in periods of extended usage lost through sublimation considerable quantities of the catalytic agent contained in the fresh catalyst. This has been found to be particularly true of hydroforming catalysts of the type of the above examples comprising molybdenum oxide supported on an alumina carrier. A recent plant charge of a commercial hydroforming catalyst of the impregnated type consisting of approximately 9% molybdenum trioxide and 91% alumina was found after six months of commercial operation to have lost some 45% of its fresh catalytic activity and at the same time some 37% of the molybdenum oxide originally contained therein. This loss in molybdenum oxide is undoubtedly a major factor in the observed loss in catalytic activity. In commercial operation, during the regeneration cycle in said hydroforming process in which the carbon deposited on the catalyst during the onstream cycle of the process is removed by introducing air into the reactor, measured temperatures in the range of 1,050° F. to 1,200° F. are often encountered indicating the temperatures in the catalyst particles may be considerably above this range. During these periods of high temperature within the catalyst, sublimation of molybdenum oxide occurs as evidenced not only by the loss of molybdenum oxide by the catalyst but also by collections of crystals of molybdenum trioxide in various cooler parts of the unit.

By preparing a catalyst by the method of sublimation as described herein the tendency of such catalyst to lose catalytic agents contained therein and in this case molybdenum trioxide is greatly reduced by the very nature of the preparation process. Thus when preparing a hydroforming catalyst of the above type by subliming the molybdenum oxide on the alumina at temperatures in the range of 1,100° F. to 1,500° F. or higher, wherein the alumina is maintained at the same temperature and wherein the disposition of molybdenum oxide on the alumina is dependent only on the absorptive capacity of the alumina and not any way upon condensation due to temperature, there is considerably less tendency for the molybdenum oxide to leave the alumina by a process of sublimation during intervals of high temperature during use than in the case of co-precipitated or impregnated catalyst wherein the molybdenum oxide is either precipitated on to the alumina or deposited on to alumina from solution in which it is contained.

Other catalysts of the types hereinbefore described may be prepared by the method of Example 1 or by other methods in which sublimation is employed. Thus I may prepare a desulfurization catalyst containing from 2% to 40% of the combined oxides of cobalt and molybdenum and from 60% to 98% of alumina by comingling either the oxides of cobalt and molybdenum in the desired proportion of other compounds of cobalt and molybdenum such as molybdenum oxide, ammonium molybdate, cobalt nitrate or the like and subjecting such mixture to the effects of temperature and pressure in the range −14 pounds per square inch to atmospheric or above. In this manner the vaporized oxides of cobalt and molybdenum are absorbed by the alumina and the desired desulfurization catalyst results.

I may modify this method of preparation if so desired by first subliming molybdenum trioxide on to the alumina subsequently impregnating the alumina with a cobalt nitrate solution to yield combined oxides of cobalt and molybdenum. Or I may desire to reverse this procedure and first sublime cobalt oxide on to the alumina and subsequently impregnate this material with a salt of molybdenum such as ammonium molybdate which yields a finished catalyst comprising the combined oxides of cobalt and molybdenum on alumina. Other modifications of the preparation of a catalyst of this type consists of subliming first, one of the oxides of cobalt or molybdenum on to the alumina and subsequently cooling said mixture and then subliming the other of the oxides of cobalt or molybdenum on to the alumina.

In preparing a catalyst of the dehydrogenation type comprising alumina and chromium oxide, alumina and chromium oxide or suitable compounds of chromium such as ammonium dichromate, chromium nitrate or the like may be comingled and subjected to temperatures of 1,000° F. to 2,000° F. at pressures in the range of −14 pounds per square inch to atmospheric or above whereupon chromium oxide is sublimed on to the alumina in a manner analogous to the sublimation of the molybdenum oxide in the preparation of a hydroforming catalyst.

It is within the scope of my invention to employ this method of preparation for any catalyst comprising carrier consising of an absorptive material such as alumina, silica, magnesia, zirconia, titania and the like and a catalytic agent consisting of the oxides or other compounds of the metals such as chromium, molybdenum, cobalt, nickel, zinc, iron, lead, cadmium, vanadium, manganese, tantalum, tungsten, titanium, platinum, columbium, scandium, thorium, uranium, zirconium, tin, copper, etc. deposited on said alumina by the sublimation of an oxygen or sulfur containing compound of the metal or metals desired. I may effect the preparation of any or all of these catalysts at any suitable temperature depending upon the sublimation rate of the compound or compounds employed and at any pressure in the range of −14 pounds per square inch to atmospheric or above. In preparing the catalysts hereinbefore described comprising alumina and one or more of the oxides of cobalt, molybdenum and chromium I may employ temperatures in the range of 500° F. to 2,000° F. and preferably in the range of 1,000° F. to 1,500° F. and pressures in the range of −14 pounds per square inch to atmospheric or above. Any reduction of pressure in preparation of these catalysts serves to hasten the sublimation of the compounds employed, but whereas to this extent reduction in pressure is desirable it is not always necessary as I may prepare my catalyst at pressures of atmospheric or greater.

In preparing my preferred catalyst as described above, I have found that the incorporation of small amounts of silica in the alumina carrier imparts certain highly desirable characteristics of heat stability and increased mechanical strength to the alumina. I have found that as much as 15% by weight of silica may be employed to advantage but I prefer to use an alumina carrier containing less than 9% by weight of silica.

Many modifications in the procedure used in carrying on the sublimation according to my process may occur to those skilled in the art such as for example maintaining the material to be sublimed and the carrier at different conditions of temperature and pressure in different zones of the furnace in the presence of various gaseous atmospheres and the different types of mechanical equipment without departing from the spirit and scope of my invention and the following claims:

I claim:

1. A process for the catalytic conversion of hydrocarbons which comprises subjecting said hydrocarbons to a temperature between about 700° F. and about 1200° F. in the presence of a catalyst comprising a major proportion of a carrier and a minor proportion of a molybdenum oxide-containing catalytic agent, said catalyst having been prepared by a process which comprises commingling said catalytic agent and said carrier both in powdered form in the proportions desired in the final product, forming the mixture into pellets, and heating the pellets in the absence of agitation, to a temperature between about 1000° F. and 1500° F. for a time sufficient to sublime said molybdenum oxide and adsorb the sublimed vapors on the carrier.

2. A process according to claim 1 in which the catalytic agent consists essentially of combined oxides of cobalt and molybdenum.

3. A process according to claim 1 in which the catalytic agent is molybdenum oxide and the carrier is alumina.

4. A process according to claim 1 in which the catalytic agent consists essentially of combined oxides of cobalt and molybdenum and the carrier is alumina.

5. A process for the catalytic conversion of hydrocarbons which comprises subjecting said hydrocarbons to a temperature between about 700° F. and about 1200° F. in the presence of a catalyst comprising a major proportion of a carrier and a minor proportion of a molybdenum oxide-containing catalytic agent, said catalyst having been prepared by a process which comprises powdering said carrier and a molybdenum compound of the group consisting of molybdenum oxide, molybdic acid, and ammonium molybdates, commingling the resulting powders in the proportions desired in the final product, forming the mixture into pellets, heating the resulting pellets so as to decompose said molybdenum compound to form molybdic oxide, and maintaining the pellets at a temperature between 1000° F. and 1500° F. in the presence of agitation for a time sufficient to sublime said molybdic oxide and adsorb the sublimed vapors on the carrier.

6. A process according to claim 5 in which the carrier is alumina.

7. A process according to claim 5 in which the carrier is alumina and the catalytic agent consists essentially of the combined oxides of cobalt and molybdenum, and the catalyst is prepared by impregnating the carrier on which the molybdenum oxide has been sublimed with an aqueous solution of a cobalt salt, and heating the product to form the combined oxides.

ROBERT L. PARKER, Jr.

REFERENCES CITED

The following references are of record in the file of this patent:

UNITED STATES PATENTS

| Number | Name | Date |
|---|---|---|
| 1,519,470 | Wilson | Dec. 16, 1924 |
| 2,223,777 | Beeck et al. | Dec. 3, 1940 |
| 2,301,802 | Burk et al. | Nov. 10, 1942 |
| 2,311,712 | Thomas | Feb. 23, 1943 |
| 2,324,165 | Layng et al. | July 13, 1943 |
| 2,328,430 | Dornte | Aug. 31, 1943 |
| 2,355,831 | Voorhees | Aug. 15, 1944 |
| 2,365,895 | Mavity | Dec. 26, 1944 |
| 2,366,217 | Ruthruff | Jan. 2, 1945 |
| 2,367,263 | Brown | Jan. 16, 1945 |

FOREIGN PATENTS

| Number | Country | Date |
|---|---|---|
| 391,988 | Great Britain | May 11, 1933 |

Certificate of Correction

Patent No. 2,499,255                                                            February 28, 1950

ROBERT L. PARKER, Jr.

It is hereby certified that error appears in the printed specification of the above numbered patent requiring correction as follows:

Column 10, line 28, for the word "presence" read *absence*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*